(12) United States Patent
Ito

(10) Patent No.: US 11,399,128 B2
(45) Date of Patent: Jul. 26, 2022

(54) POSITION DETECTING APPARATUS FOR ACQUIRING A ROTATIONAL POSITION OF A ROTATING MEMBER

(71) Applicant: CANON KABUSHIKI KAISHA, Tokyo (JP)

(72) Inventor: Hiroki Ito, Hiratsuka (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 125 days.

(21) Appl. No.: 16/905,748

(22) Filed: Jun. 18, 2020

(65) Prior Publication Data
US 2020/0404155 A1 Dec. 24, 2020

(30) Foreign Application Priority Data
Jun. 20, 2019 (JP) .............................. JP2019-114485

(51) Int. Cl.
*H04N 5/232* (2006.01)
*G01B 11/02* (2006.01)
*G03B 13/36* (2021.01)

(52) U.S. Cl.
CPC ....... *H04N 5/23212* (2013.01); *G01B 11/028* (2013.01); *G03B 13/36* (2013.01)

(58) Field of Classification Search
CPC ........... H04N 5/23212; H04N 5/23209; G01B 11/028; G03B 13/36; G03B 5/00; G03B 17/14; G03B 2205/0046; G03B 2205/0053; G03B 13/18; G01D 5/2451; G02B 7/28
See application file for complete search history.

(56) References Cited

U.S. PATENT DOCUMENTS

| 2013/0050558 | A1* | 2/2013 | Katsumata | H04N 5/225 348/335 |
| 2015/0301429 | A1* | 10/2015 | Aoshima | G03B 9/40 396/256 |
| 2019/0033687 | A1* | 1/2019 | Katsumata | G03B 13/36 |
| 2019/0187404 | A1* | 6/2019 | Onaka | G03B 17/02 |

FOREIGN PATENT DOCUMENTS

JP   2006-258586 A   9/2006

* cited by examiner

*Primary Examiner* — Gevell V Selby
(74) *Attorney, Agent, or Firm* — Cowan, Liebowitz & Latman, P.C.

(57) ABSTRACT

A position detecting apparatus includes a rotating member rotatable and having a first cam and a second cam, a first detector, a second detector, and a rotational position acquirer. The first cam moves the first moving unit in a first rotational range of the rotating member and a second rotational range following the first rotational range. The second cam moves the second moving unit in the second rotational range of the rotating member and a third rotational range following the second rotational range. The rotational position acquirer acquires the rotational position using the first signal in the first rotational range and in part on a first rotational range side in the second rotational range, and acquires the rotational position using the second signal in the third rotational range and in part on a third rotational range side in the second rotational range.

7 Claims, 7 Drawing Sheets

POSITION DETECTING APPARATUS FOR ACQUIRING A ROTATIONAL POSITION OF A ROTATING MEMBER

BACKGROUND OF THE INVENTION

Field of the Invention

The present invention relates to a position detecting apparatus suitable for an optical apparatus, such as a lens apparatus.

Description of the Related Art

Some optical apparatuses have a structure for detecting a position of a movable lens or another movable member. Japanese Patent Laid-Open No. ("JP") 2006-258586 discloses an optical apparatus that detects the position of the movable member using a potentiometer and a magnetic or optical encoder, each of which outputs a signal as the movable member moves.

However, complicated calculation processing is necessary to detect the position of the movable member using an output signal that linearly increases and decreases from the potentiometer and an output signal that periodically changes from the encoder as in the optical apparatus disclosed in JP 2006-258586.

SUMMARY OF THE INVENTION

The present invention provides a position detecting apparatus and an optical apparatus having the same, each of which can detect a position (rotational position) of a movable member with a simple configuration and processing.

A position detecting apparatus according to one aspect of the present invention includes a rotating member rotatable and having a first cam and a second cam, a first detector having a first moving unit moved by the first cam as the rotating member rotates, the first detector being configured to output a first signal corresponding to a position of the first moving unit, a second detector having a second moving unit moved by the second cam as the rotating member rotates, the second detector being configured to output a second signal corresponding to a position of the second moving unit, and a rotational position acquirer configured to acquirer a rotational position of the rotating member using the first signal and the second signal. The first cam moves the first moving unit in a first rotational range of the rotating member and a second rotational range following the first rotational range. The second cam moves the second moving unit in the second rotational range of the rotating member and a third rotational range following the second rotational range. The rotational position acquirer acquires the rotational position using the first signal in the first rotational range and in part on a first rotational range side in the second rotational range, and acquires the rotational position using the second signal in the third rotational range and in part on a third rotational range side in the second rotational range An optical apparatus according to another aspect of the present invention includes the above position detecting apparatus.

Further features of the present invention will become apparent from the following description of exemplary embodiments with reference to the attached drawings.

DESCRIPTION OF THE EMBODIMENTS

Referring now to the accompanying drawings, a description will be given of embodiments according to the present invention.

First Embodiment

Figure 1A:
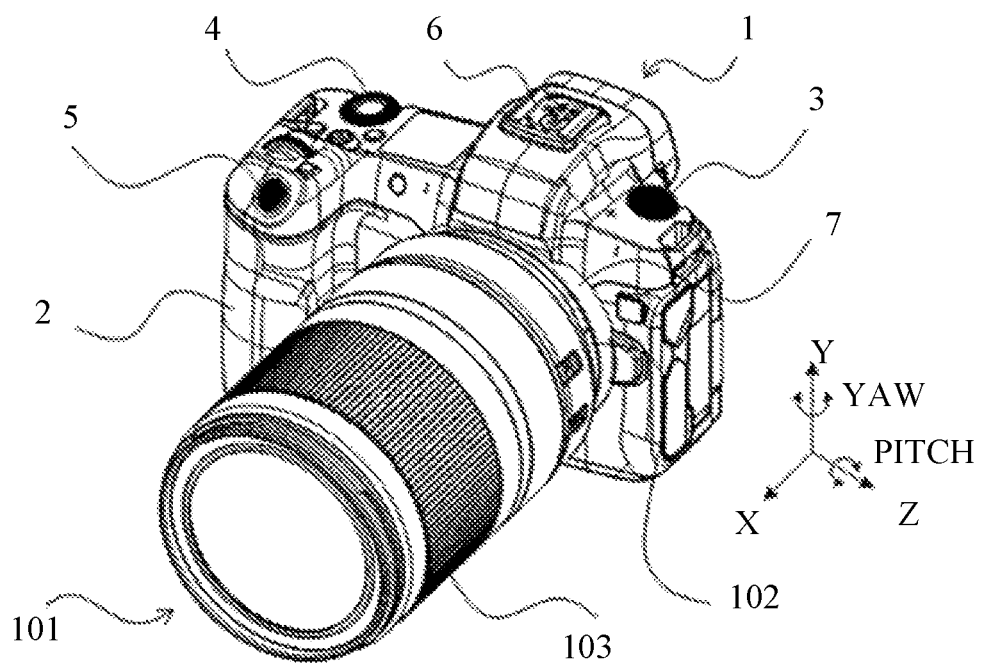
FIGS. 1A and 1B are a front perspective view and a rear perspective view of a lens interchangeable type digital camera according to a first embodiment of the present invention.
Figure 1B:
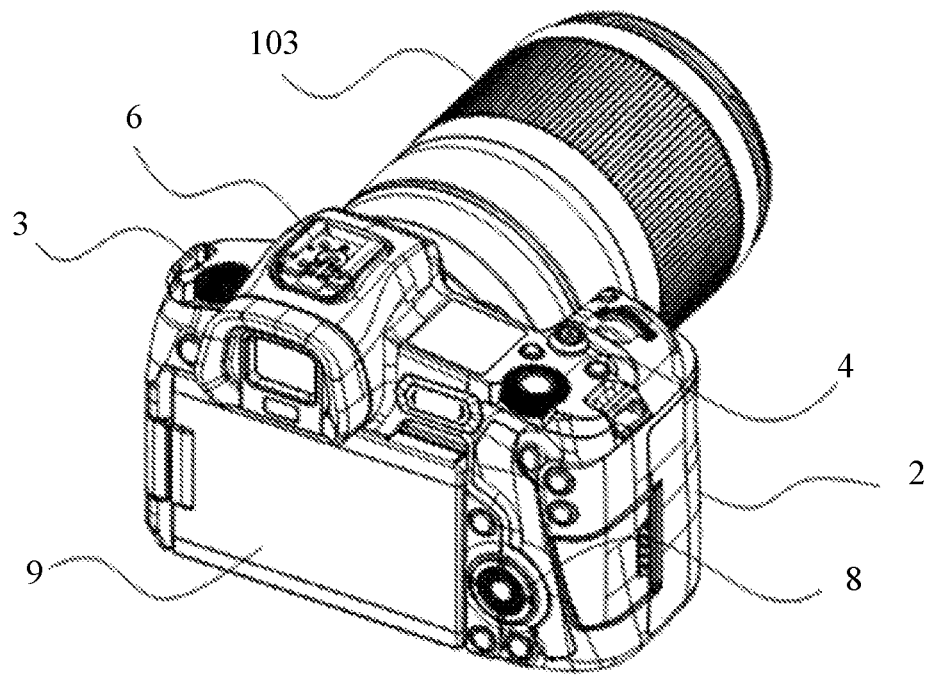

FIGS. 1A and 1B illustrate an appearance of a lens interchangeable type digital camera (referred to as a camera body hereinafter) 1 on which a lens 101 is detachably mounted. As illustrated in FIG. 1A, an optical axis direction in which the optical axis of the image pickup optical system housed in the interchangeable lens 101 extends will be defined as an X-axis direction, and directions orthogonal to the X-axis direction will be defined as a Z-axis direction (horizontal direction) and a Y-axis direction (vertical direction). Hereinafter, the Z-axis direction and the Y-axis direction will also be collectively referred to as Z/Y-axis directions. A rotational direction around the Z axis will be defined as a pitch (Pitch) direction, and a rotational direction around the Y axis will be defined as a yaw (Yaw) direction. Hereinafter, the pitch direction and the yaw direction are also collectively referred to as pitch/yaw directions.

A grip section 2 for the user to grip the camera body 1 with his hand is provided on the left side (right side viewed from the rear) of the camera body 1 viewed from the front (object side). A power supply operation unit 3 is disposed on an upper surface of the camera body 1. When the user turns on the power operation unit 3 while the camera body 1 is powered off, the camera body 1 is turned on and imaging is available. When the user turns off the power operation unit 3 while the camera body 1 is powered on, the camera body 1 becomes turned off.

A mode dial 4, a release button 5, and an accessory shoe 6 are provided on the top surface part of the camera body 1. The user can switch an image pickup mode by rotating the mode dial 4. The image pickup mode includes a manual still image pickup mode in which the user can arbitrarily set an image pickup condition, such as a shutter speed and an F-number (aperture value), an automatic still image pickup mode in which a proper exposure amount can be automatically obtained, and a motion image pickup mode in which a motion image can be captured.

When the user half-presses a release button 5, the user can instruct an image pickup preparation operation including autofocus (AF), auto-exposure (AE), and the like, and when the user fully presses the release button 5, the user can instruct imaging. An accessory, such as an unillustrated external flash and an external viewfinder (EVF), can be detachably attached to the accessory shoe 6.

The interchangeable lens 101 is mechanically and electrically connected to a camera mount 7 provided on the camera body 1 via a lens mount 102. As described above, the interchangeable lens 101 houses the image pickup optical system that forms an object image by forming light from the object. Provided on the outer circumference of the interchangeable lens 101 is a zoom operation ring 103 as a rotating member that is rotatable around the optical axis by a user operation.

As illustrated in FIG. 1B, a rear operation unit 8 and a display unit 9 are provided on the rear surface of the camera body 1. The rear operation unit 8 includes a plurality of buttons and dials to which various functions are assigned. When the camera 1 is powered on and the still or motion image pickup mode is set, the display unit 9 displays a through image of the object image captured by the image sensor. The display unit 9 displays image pickup parameters indicating the image pickup condition, such as the shutter speed and the F-number, and the user can change the set value of the image pickup parameter by operating the rear operation unit 8 while viewing the display. The rear operation unit 8 includes a playback button for instructing playback of a recorded captured image. When the user operates the playback button, the captured image is played back and displayed on the display unit 9.

Figure 2:
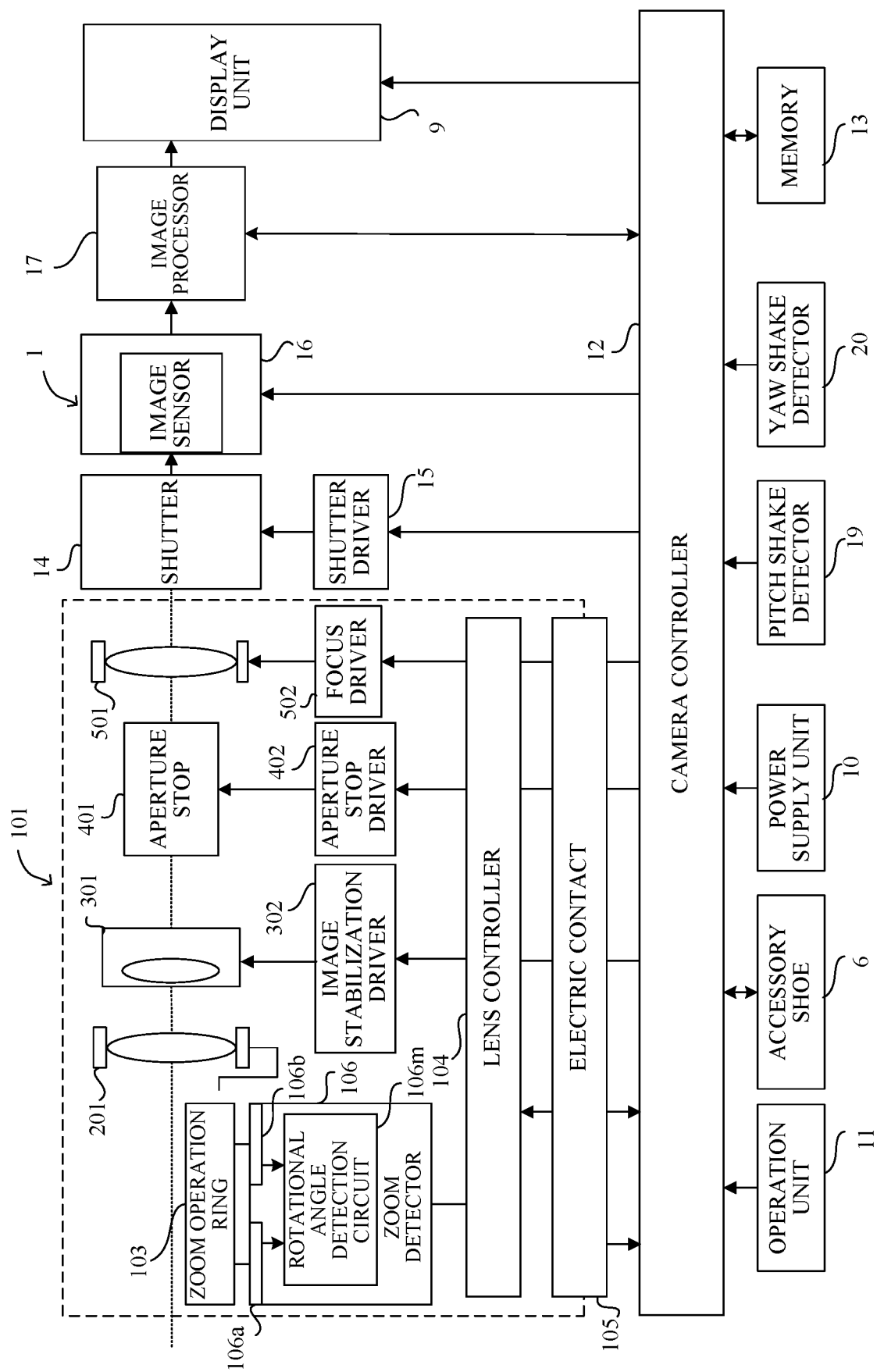
FIG. 2 is a block diagram illustrating a configuration of the lens interchangeable type digital camera according to the first embodiment.

FIG. 2 illustrates an electrical and optical configuration of the interchangeable lens 101 and the camera body 1. The camera body 1 has a power supply unit 10 for supplying the power to the inside of the camera body 1 and the interchangeable lens 101, and an operation unit 11 including the power operation unit 3, the mode dial 4, the release button 5, the rear operation unit 8, and a touch panel function of the display unit 9. A camera controller 12 provided in the camera body 1 and a lens controller 104 provided in the interchangeable lens 101 communicate with each other and control a camera system including the camera body 1 and the interchangeable lens 101.

The camera controller 12 reads out and executes the computer program stored in a memory 13. At this time, the camera controller 12 communicates various control signals, data, and the like with the lens controller 104 via a communication terminal of an electric contact 105 provided to the lens mount 102. The electric contact 105 includes a power supply terminal that supplies the power from the power supply unit 10 to the interchangeable lens 101.

The image pickup optical system in the interchangeable lens 101 includes a zoom lens 201 that moves in the optical axis direction to change the angle of view (or for zooming) in accordance with the rotational operation of the zoom operation ring 103 by the user, and a lens image-stabilization unit 301 including a shift lens as an image stabilizer that reduces the image blurs. The lens image-stabilization unit 301 performs the image stabilization operation that reduces the image blur by moving (shifting) the shift lens in the Z/Y-axis direction orthogonal to the optical axis. The image pickup optical system further includes an aperture stop unit (diaphragm) 401 that adjusts a light amount and a focus lens 501 that moves in the optical axis direction for focusing.

The interchangeable lens 101 further includes an image stabilization driver 302 that drives the lens image-stabilization unit 301 and shifts the shift lens, an aperture stop driver 402 that drives the aperture stop 401, and a focus driver 502 that drives the focus lens 501.

The camera body 1 includes a shutter unit 14, a shutter driver 15, an image sensor (image pickup element) 16, an image processor 17, and the camera controller 12. The shutter unit 14 controls an exposure amount of the image sensor 16. The image sensor 16 photoelectrically converts (captures) an object image formed by the image pickup optical system and outputs an image signal. The image processor 17 generates an image signal by performing various image processing for the imaging signal. The display unit 9 displays a live-view image in accordance with an image signal output from the image processor 17, displays the imaging parameter, or reproduces and displays the captured image stored in the memory 13 or unillustrated recording medium.

The camera controller 12 controls the driving of the aperture stop unit 401 and the shutter unit 14 via the aperture stop driver 402 and the shutter driver 15 in accordance with the set values of the F-number and the shutter speed received from the operation unit 11. The camera controller 12 performs the AF processing or AE processing according to the half-press operation of the operation unit 11 (release button 5). The camera controller 12 controls the driving of the aperture stop unit 401 and the shutter unit 14 based on the result of the AE processing according to the full-press operation of the operation unit 11 (release button 5), and causes the image sensor 16 to perform imaging.

The camera body 1 also includes a pitch shake detector 19 and a yaw shake detector 20 that can detect camera shakes such as manual shakes. The pitch shake detector 19 and the yaw shake detector 20 detect the camera shakes in the pitch direction and the yaw direction, respectively, using an angular velocity sensor (vibration gyro) or an angular acceleration sensor and output a shake signal.

The camera controller 12 calculates the shift position of the shift lens in the lens stabilization unit 301 in the Y-axis direction using the shake signal from the pitch shake detector 19, and the shift position of the shift lens in the Z-axis direction using the shake signal from the yaw shake detector 20. Then, the camera controller 12 controls the driving of the lens image-stabilization unit 301 in accordance with the calculated shift position in the pitch/yaw directions, and reduces image blurs during displaying of a live-view image and during image pickup.

The interchangeable lens 101 has a zoom detector 106 serving as a position detecting apparatus that detects the rotational angle (rotational position) of the zoom operation ring 103. The zoom detector 106 includes, for example, a resistance-type linear potentiometer, and detects an absolute value of the rotational angle of the zoom operation ring 103. Information on the rotational angle of the zoom operation ring 103 detected by the zoom detector 106 is transmitted to the lens controller 104, and used to control the focus lens 501 so as to correct focus variations caused by zooming and the aperture stop unit 401 so as to correct the brightness during zooming and the like. The information on the rotational angle of the zoom operation ring 103 is recorded in the memory 13 and the recording medium together with a recording use image generated by the imaging. The zoom detector 106 can detect the absolute value of the rotational angle of the zoom operation ring 103 even when the zoom operation ring 103 is rotated while the camera system is powered off, and thereafter the power is turned on.

Figure 3:
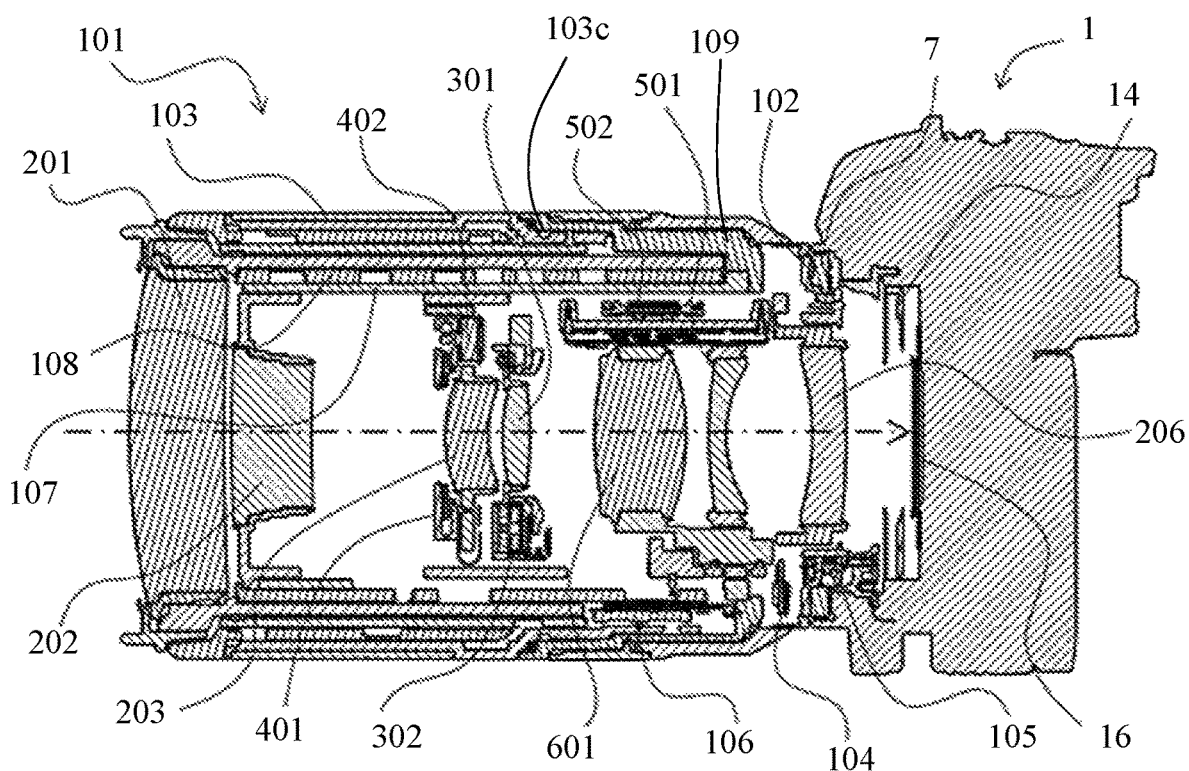
FIG. 3 is a sectional view of the lens interchangeable type digital camera according to the first embodiment.

Referring now to FIG. 3, a description will be given of a positional relationship of the components in the interchangeable lens 101 and the camera body 1. FIG. 3 illustrates a section of the interchangeable lens 101 and the camera body 1 on the XY plane including the optical axis indicated by an alternate long and short dash line. The interchangeable lens 101 illustrated in the figure has an illustrative six-unit image pickup optical system. In other words, the image pickup optical system includes a first zoom unit including a zoom lens 201, a second zoom unit 202, a third zoom unit including the aperture stop unit 401 and the lens image-stabilization unit 301, a fourth zoom unit 601 serving as an adjustment unit, a fifth zoom unit including the focus lens 501, and a sixth zoom unit 206. The position of the adjustment unit is intentionally shifted and fixed in order to adjust the optical performance of the entire image pickup optical system. The image pickup optical system illustrated in the drawing is in a wide-angle end zoom state.

A linear guide cylinder 107 is fixed onto a lens mount 102 via a fixed cylinder 109. Unillustrated bayonet claws are disposed on the outer circumferential surface of the linear guide cylinder 107 at regular intervals in the circumferential direction. An unillustrated circumferential groove portion engaged with the bayonet claw of the linear guide cylinder 107 is provided on the inner circumferential surface of the cam ring 108. Thereby, a cam ring 108 can rotate around the optical axis at a fixed position in the optical axis direction relative to the linear guide cylinder 107. The cam ring 108 is connected to the zoom operation ring 103, and as the zoom operation ring 103 rotates around the optical axis, the cam ring 108 also rotates around the optical axis.

The linear guide cylinder 107 has linear guide grooves for guiding the first to sixth zoom units in the optical axis direction. The cam ring 108 has cam groove portions for moving the first to sixth zoom units in the optical axis direction as the cam ring 108 rotates. Each of the first to sixth zoom units has a cam follower, and each cam follower is engaged with a corresponding linear guide groove and a corresponding cam groove portion.

Due to this structure, when the user rotates the zoom operation ring 103, the cam ring 108 rotates, and each of the zoom units serving as optical elements is moved along the optical axis direction by the engagement of the cam follower of each zoom unit with the linear guide groove portion and the cam groove portion. At this time, the rotational angle of the zoom operation ring 103 is detected by the zoom detector 106. The lens controller 104 controls the driving of the focus lens 501 so as to correct the focus variations according to the detected rotational angle.

The target position of the focus lens 501 at this time is determined by the rotational angle of the zoom operation ring 103 and the object distance, and the object distance is calculated from the position before the focus lens 501 is driven and the rotational angle of the zoom operation ring 103. For example, when the zoom operation ring 103 is rotated after the focus lens 501 is moved to a position where the object is focused by the AF processing, the focus lens 501 is moved to the target position determined based on the object distance and the rotational position of the zoom operation ring 103 detected by the zoom detector 106. Thereby, zooming can be performed on an object at a certain distance while the in-focus state is maintained.

The lens controller 104 controls the aperture stop unit 401 so as to obtain an aperture diameter corresponding to the rotational angle of the zoom operation ring 103. Thereby, the aperture diameter can be continuously changed together with zooming.

Figure 4:
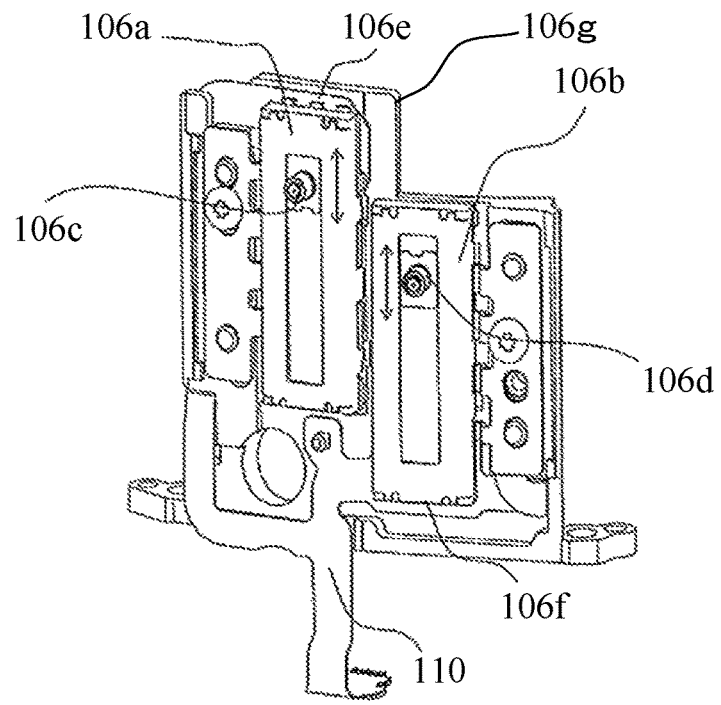
FIG. 4 is a perspective view of a zoom detector according to the first embodiment.

In this embodiment, the zoom detector 106 includes a first zoom encoder 106a serving as a first detector and a second zoom encoder 106b serving as a second detector. FIG. 4 illustrates the first zoom encoder 106a and the second zoom encoder 106b fixed to an encoder base member 106g with fixing screws. The fixing screw of each encoder is disposed on the side of the encoder (in a direction orthogonal to the slider moving direction described later).

The first zoom encoder 106a and the second zoom encoder 106b include resistance-type linear potentiometers having the same configuration. The first zoom encoder 106a includes a first slider 106c serving as a first moving unit movable in an arrow direction in the drawing, and a first output unit 106e that outputs a first signal corresponding to a resistance value that varies according to the position of the first slider 106c. Similarly, the second zoom encoder 106b includes a second slider 106d serving as a second moving unit movable in an arrow direction in the drawing and a second output unit 106f that outputs a second signal corresponding to a resistance value that varies according to the position of the second slider 106d. The first slider 106c and the second slider 106d can move in the same slider moving directions, which is the optical axis direction in this embodiment. The first slider 106c and the second slider 106d have also the same slidable amounts (slide strokes).

A rotational angle detection circuit (rotational position acquirer) 106m in the zoom detector 106 detects (acquires) the rotational angle of the zoom operation ring 103 or the zoom position as the positions of the first to sixth zoom units in the optical axis direction, using the first signal output from the first zoom encoder 106a and the second signal output from the second zoom encoder 106b.

The first zoom encoder 106a and the second zoom encoder 106b are arranged such that the first output unit 106e and the second output unit 106f are located on opposite sides in the slider moving direction. Due to this arrangement, the fixing screw of the first zoom encoder 106a and the fixing screw of the second zoom encoder 106b can be disposed on opposite sides in the circumferential direction (rotational direction) of the zoom operation ring 103 with respect to the first and second zoom encoders 106a and 106b. Thereby, the first and second zoom encoders 106a and 106b can be arranged so as to be adjacent to each other in the circumferential direction of the zoom operation ring 103, and most of the first slider cam groove portion and the second slider cam groove portion described later that move the first slider 106c and the second slider 106d, respectively, can be arranged in the same area in the circumferential direction of the zoom operation ring 103. The output unit of each zoom encoder is connected to the rotational angle detection circuit 106m via a flexible printed circuit board 110.

Figure 5:
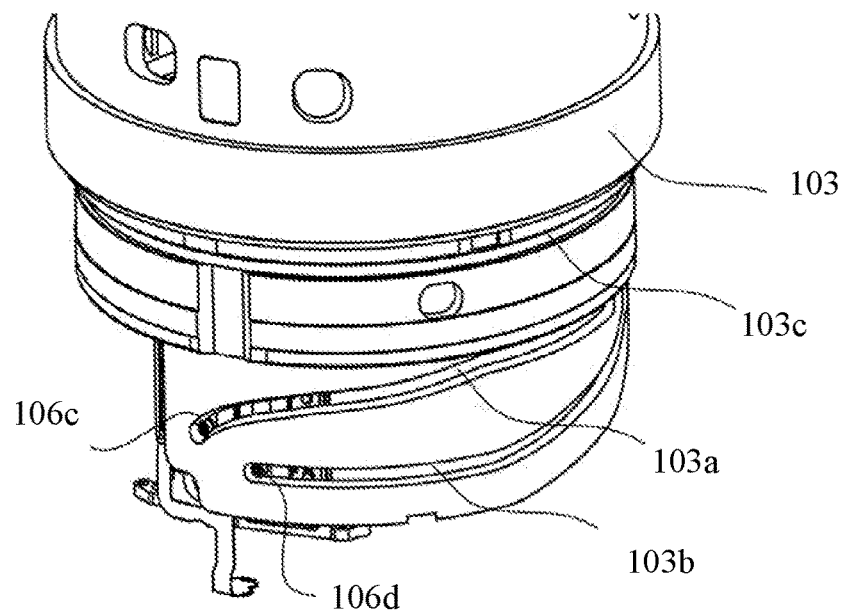
FIG. 5 is a perspective view of the zoom detector and a zoom operation ring according to the first embodiment.

As illustrated in FIG. 5, the first slider 106c of the first zoom encoder 106a is engaged with a first slider cam groove portion 103a formed as a first cam on the zoom operation ring 103. The second slider 106d of the second zoom encoder 106b is engaged with a second slider cam groove portion 103b formed as a second cam on the zoom operation ring 103. Bayonet groove portions 103c extending in the circumferential direction are formed in the zoom operation ring 103. The zoom operation ring 103 is rotatable around the optical axis at a fixed position in the optical axis direction by engaging a plurality of bayonet claws provided to the fixed cylinder 109 illustrated in FIG. 3 with the bayonet groove portions 103c.

As the zoom operation ring 103 rotates, the first slider 106c moves by the engagement with the first slider cam groove portion 103a, and the second slider 106d moves by the engagement with the second slider cam groove portion 103b. This embodiment forms the first slider cam groove portion 103a and the second slider cam groove portion 103b such that the rotational range of the zoom operation ring 103 in which the first slider 106c moves and the rotational range of the zoom operation ring 103 in which the second slider 106d moves only partially overlap each other and are different from each other.

Figure 6:
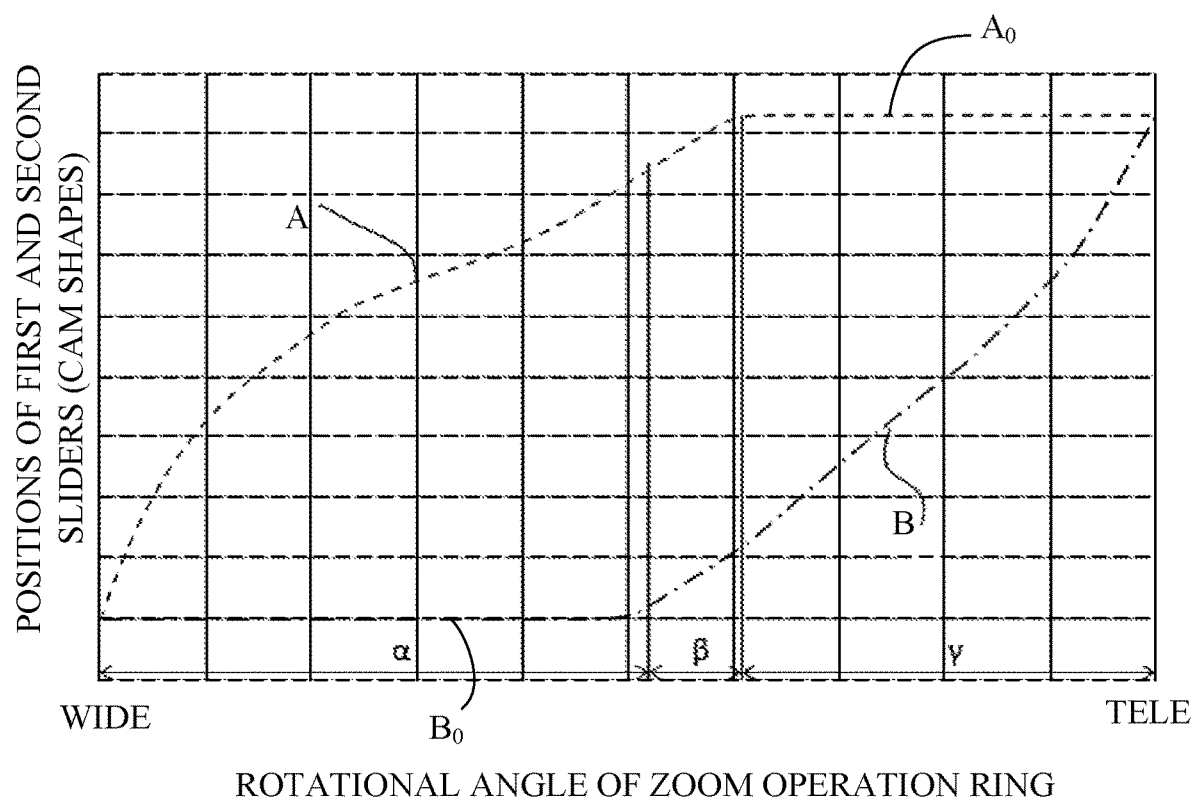
FIG. 6 illustrates a relationship between a rotational angle of the zoom operation ring and a position of a slider in a zoom encoder according to the first embodiment.
Figure 7:
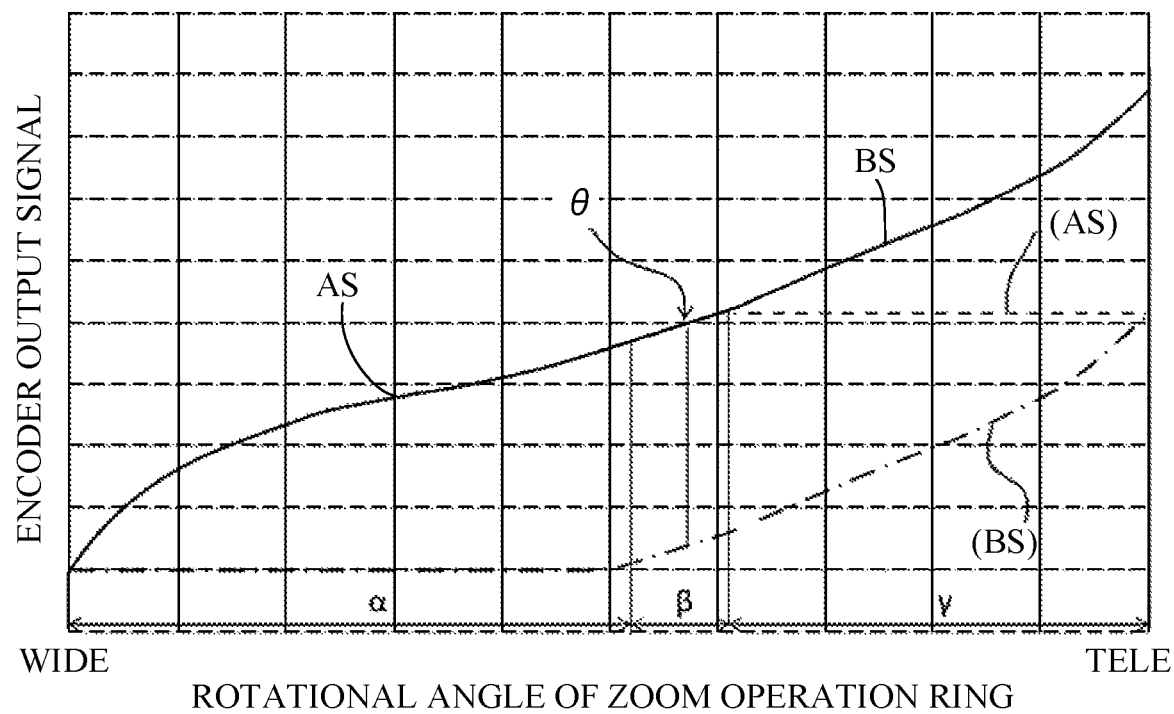
FIG. 7 illustrates the rotational angle of the zoom operation ring and an output signal from the zoom encoder according to the first embodiment.

FIG. 6 illustrates a relationship among the rotational angle of the zoom operation ring 103 from the wide-angle end (WIDE) to the telephoto end (TELE), a position A of the first slider 106c, and a position B of the second slider 106d or the cam shapes of the first and second slider cam groove portions 103a and 103b. FIG. 7 also illustrates changes of values of a first signal AS output from the first zoom encoder 106a and a second signal BS output from the second zoom encoder 106b. In FIGS. 6 and 7, the abscissa axis indicates the rotational angle of the zoom operation ring 103, the ordinate axis in FIG. 6 indicates the position of each slider, and the ordinate axis in FIG. 7 indicates the signal value.

The zoom operation ring 103 can rotate in a first rotational range $\alpha$, a second rotational range $\beta$ following the first rotational range $\alpha$, and a third rotational range $\gamma$ following the second rotational range $\beta$. As understood from FIG. 6, the first slider cam groove portion 103a has a cam shape for moving the first slider 106c when the zoom operation ring 103 rotates in the first and second rotational ranges $\alpha$ and $\beta$, and a first zero-lift cam portion $A_0$ that does not move the first slider 106c when the zoom operation ring 103 rotates in the third rotational range $\gamma$. The second slider cam groove portion 103b has a second zero-lift cam portion $B_0$ that does not move the second slider 106d when the zoom operation ring 103 rotates in the first rotational range $\alpha$, and a cam shape that moves the second slider 106d when the zoom operation ring 103 rotates in the second and third rotational ranges $\beta$ and $\gamma$.

Hence, as illustrated by a broken line in FIG. 7, the value of the first signal AS changes when the zoom operation ring 103 rotates in the first and second rotational ranges $\alpha$ and $\beta$, and does not change when the zoom operation ring 103 rotates in the third rotational range $\gamma$. As indicated by an alternate long and short dash line, the value of the second signal BS does not change when the zoom operation ring 103 rotates in the first rotational range $\alpha$, and changes when the zoom operation ring 103 rotates in the second and third rotational ranges $\beta$ and $\gamma$. The values of the first and second signals AS and BS increase as the rotational angle of the zoom operation ring 103 is closer to TELE, and decrease as the rotational angle of the zoom operation ring 103 is closer to WIDE. The second rotational range $\beta$ is narrower than each of the first and third rotational ranges $\alpha$ and $\gamma$.

As illustrated by a solid line in FIG. 7, the rotational angle detection circuit 106m detects the rotational angle located in the first rotational range $\alpha$ and at part on the WIDE side (first rotational range side) of a switching point (predetermined rotational position) $\theta$ in the second rotational range $\beta$ of the zoom operation ring 103 using the first signal AS. In addition, the rotational angle detection circuit 106m detects the rotational angle located at part on the TELE side (third rotational range side) of the switching point $\theta$ in the second rotational range $\beta$ and in the third rotational range $\gamma$ using the second signal BS. The switching point $\theta$ is disposed approximately at the center of the second rotational range $\beta$. Both the first and second signals AS and BS from the first and second zoom encoders 106a and 106b in the second rotational range $\beta$ are changed so as to prevent the discontinuity in signal value when use of one of the first and second signals AS and BS is shifted to use of the other near the switching point. Moreover, disposing the switching point $\theta$ approximately at the center of the rotational range $\beta$ is to prevent the discontinuity in signal value, for example, when an error such as a hysteresis caused by the rotational direction is generated in the first signal AS and the second signal BS and the switching position shifts.

Thus, the rotational angle of the zoom operation ring 103 is detected by using two zoom encoders having different rotational ranges for detecting the rotational angles. The detection signal of the zoom encoder is generated by the resistance value change of the potentiometer, and is digitally divided by the A/D conversion. At this time, if the dividing number is increased for the stroke of one zoom encoder, the dividable number is limited due to the influence of noises and the like. This embodiment can obtain a larger dividing number for the rotational angle than that when only a single zoom encoder is used to detect the rotational angle of the zoom operation ring 103, and can detect the rotational angle of the zoom operation ring 103 with higher accuracy. Even if two zoom encoders are used, a signal from one zoom encoder is always used to detect the rotational angle of the zoom operation ring 103. Thus, the rotational angle of the zoom operation ring 103 can be detected by simple processing. The structure of the zoom detector 106 can be made simpler by using the linear potentiometers having the same structures for the two zoom encoders.

By providing the first slider cam groove portion 103a and the second slider cam groove portion 103b, the lift angle of the cam groove portion can be made wider than that where only one cam groove portion is provided. Thereby, the hysteresis can be reduced at the time of reversing the rotational direction of the zoom operation ring 103, which is caused by the engagement between each slider and each slider cam groove portion.

Three or more zoom encoders may be used, each having a different rotational range for detecting the rotational angle of the zoom operation ring 103.

Figure 8:
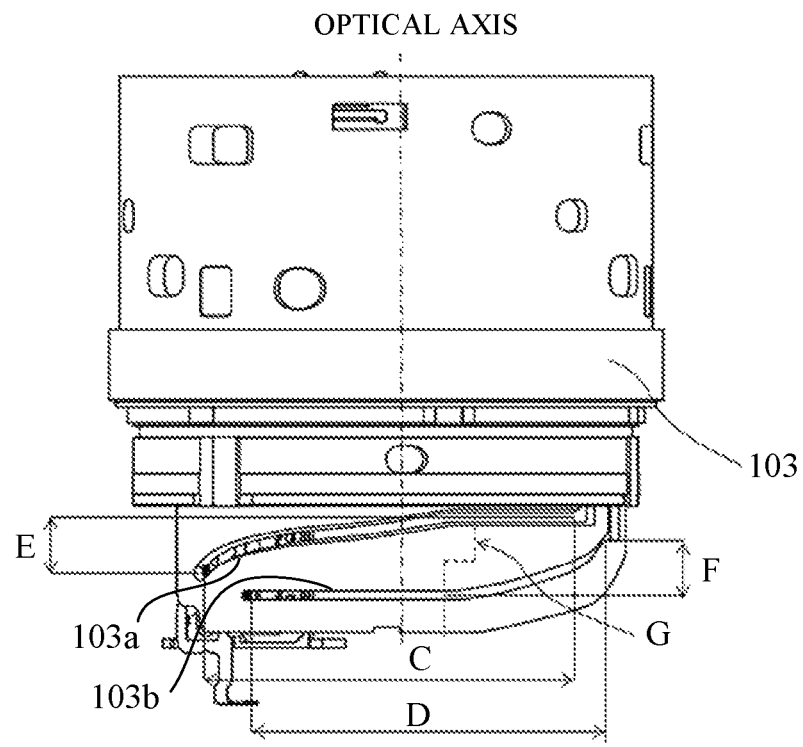
FIG. 8 is a top view of the zoom operation ring according to the first embodiment.

Referring now to FIG. 8, a description will be given of the arrangement of the first slider cam groove portion 103a and the second slider cam groove portion 103b. FIG. 8 illustrates the zoom operation ring 103 viewed from a radial direction orthogonal to the optical axis. The first slider 106c engaged with the first slider cam groove portion 103a and the second slider 106d engaged with the second slider cam groove portion 103b are arranged at positions shifted from each other in the circumferential direction of the zoom operation ring 103. Hence, the first slider cam groove portion 103a and the second slider cam groove portion 103b are also formed in areas of the zoom operation ring 103 that are shifted from each other in the circumferential direction.

Where an area where the first slider cam groove portion 103a is formed is C and an area where the second slider cam groove portion 103b is formed is D in the circumferential direction of the zoom operation ring 103, the areas C and D are at least partially the same areas in the circumferential direction. Where an area in which the first slider cam groove portion 103a is formed is E and an area in which the second slider cam groove portion 103b is formed is F in the optical axis direction (slider moving direction), the areas E and F are at least partially the same areas in the optical axis direction. Thereby, the areas on the zoom operation ring 103 can be narrower where the first slider cam groove portion 103a and the second slider cam groove portion 103b are formed.

In order to detect the rotational angle within the entire rotational range using only one linear potentiometer when the rotational range of the zoom operation ring is wide, a slider cam groove portion needs to be correspondingly long in both the circumferential direction and the optical axis direction and thus the zoom operation ring becomes large and it becomes difficult to form the slider cam groove portion on the zoom operation ring. On the other hand, this embodiment uses two linear potentiometers adjacent to each other, forms the slider cam groove portions 103a and 103b in the smaller areas on the zoom operation ring 103 than those where one linear potentiometer is used, and can detect the rotational angle of the zoom operation ring 103 within the entire rotational range. As a result, this embodiment can make compact the zoom operation ring 103 and the interchangeable lens 101.

This embodiment has described the first and second slider cam grooves 103a and 103b provided on the zoom operation ring 103, but the cam ring 108 that serves as the rotating member and integrally rotates with the zoom operation ring 103 may have the first and second slider cam groove portions.

The zoom operation ring 103 according to this embodiment is made of resin. The molding die used herein is divided in the circumferential direction of the zoom operation ring 103. When the mold dividing line is set so as to cross the first and second slider cam groove portions 103a and 103b as illustrated by a broken line G in FIG. 8, burrs and steps are formed on the zoom operation ring 103 along the dividing line, which affect the shape accuracy of each slider cam groove portion or the detection accuracy of the rotational angle. Accordingly, this embodiment sets the mold dividing line so that the mode dividing line can cross (pass) the first and second zero-lift cam portions of the first and second slider cam groove portions 103a and 103b which are not used to detect the rotational angle of the zoom operation ring 103. Thereby, the mold dividing line can be prevented from negatively affecting the detection accuracy of the rotational angle of the zoom operation ring 103.

Second Embodiment

Figure 9:
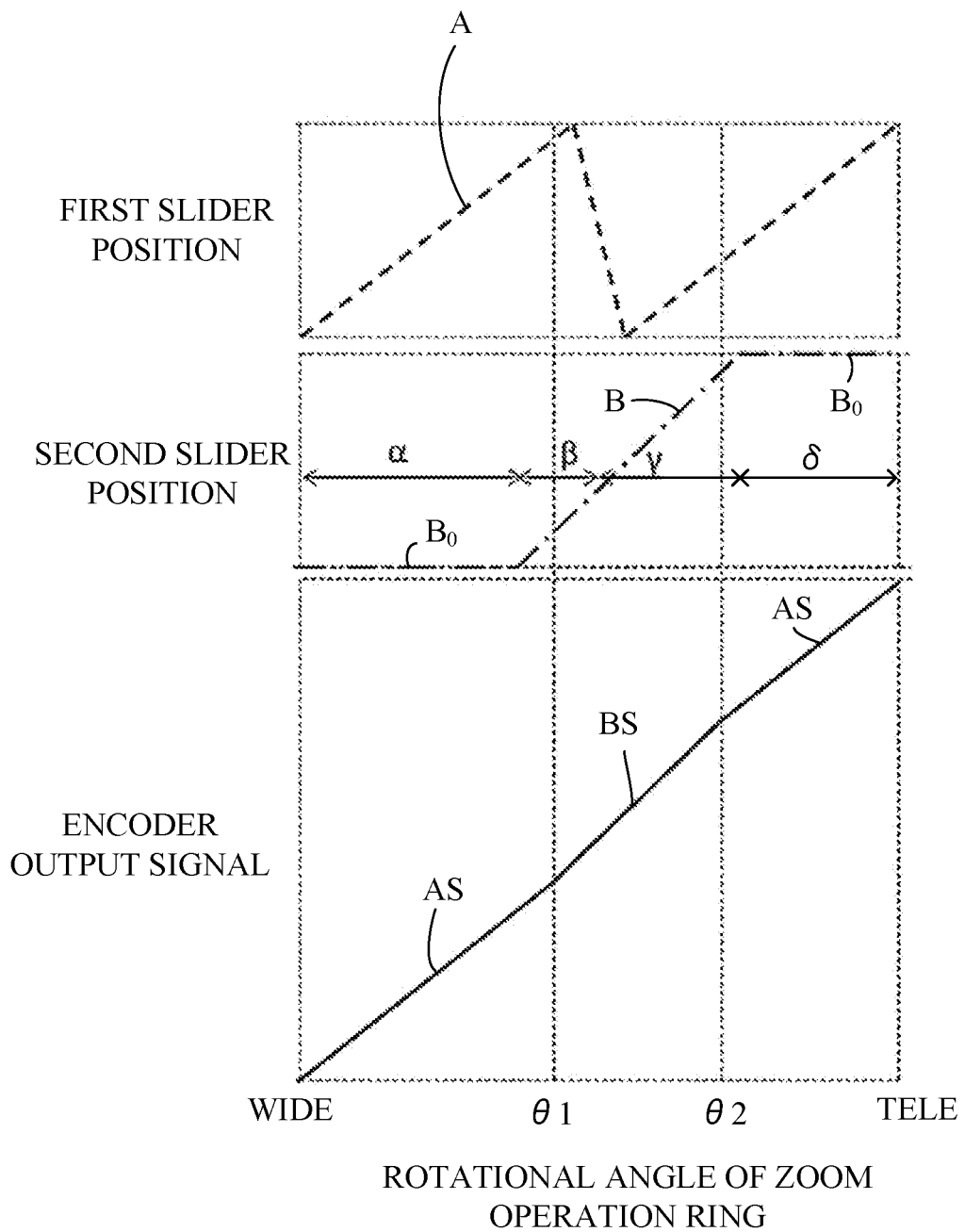
FIG. 9 illustrates a rotational angle of a zoom operation ring and a detection signal according to a second embodiment of the present invention.

FIG. 9 illustrates a relationship among the rotational angle of the zoom operation ring from WIDE to TELE, the position A of the first slider of the first zoom encoder (first detector), and the position B of the second slider of the second zoom encoder (second detector) according to a second embodiment of the present invention or the cam shapes of the first and second slider cam groove portions for moving the first and second sliders, respectively. FIG. 9 also illustrates the changes in values of the first signal AS output from the first zoom encoder and the second signal BS output from the second zoom encoder. The abscissa axis in FIG. 9 indicates the rotational angle of the zoom operation ring 103, and the ordinate axis indicates the position of each slider and signal value.

The zoom operation ring includes the first rotational range $\alpha$, the second rotational range $\beta$ following the first rotational range $\alpha$, the third rotational range $\gamma$ following the second rotational range $\beta$, and a fourth rotational range $\delta$ following the third rotational range $\gamma$.

When the zoom operation ring is rotated from WIDE to TELE, the first slider cam groove portion moves the first slider (whose position is indicated by A) in one slider moving direction in the first rotational range $\alpha$ and the second rotational range $\beta$, moves the first slider in the other slider moving direction in the third rotational range $\gamma$, and again moves the first slider in the one slider moving direction in the fourth rotational range $\delta$. The second slider cam groove portion does not move the second slider (whose position is indicated by B) in the first rotational range $\alpha$, moves the second slider in one slider moving direction in the second rotational range $\beta$ and the third rotational range $\gamma$, and does not move the second slider in the fourth rotational range $\delta$. In other words, the second slider cam groove portion has the zero-lift cam $B_0$ for the first and fourth rotational ranges $\alpha$ and $\delta$.

The zoom detector (rotational angle detection circuit) detects the rotational angle using the first signal AS from the first zoom encoder in a rotational range from WIDE to $\theta 1$, where $\theta 1$ in the second rotational range $\beta$ and $\theta 2$ in the third rotational range $\gamma$ are set to the switching points (predetermined rotational positions). In the rotational range from $\theta 1$ to $\theta 2$, the rotational angle is detected using the second signal BS from the second zoom encoder. In the rotational range from $\theta 2$ to TELE, the rotational angle is detected using the first signal AS from the first zoom encoder.

This embodiment can detect the rotational angle with a larger rotational range of the zoom operation ring than that of the first embodiment without increasing the areas in the slider moving direction (optical axis direction) where the first and second slider cam groove portions are formed on the zoom operation ring.

Third Embodiment

Figure 10:
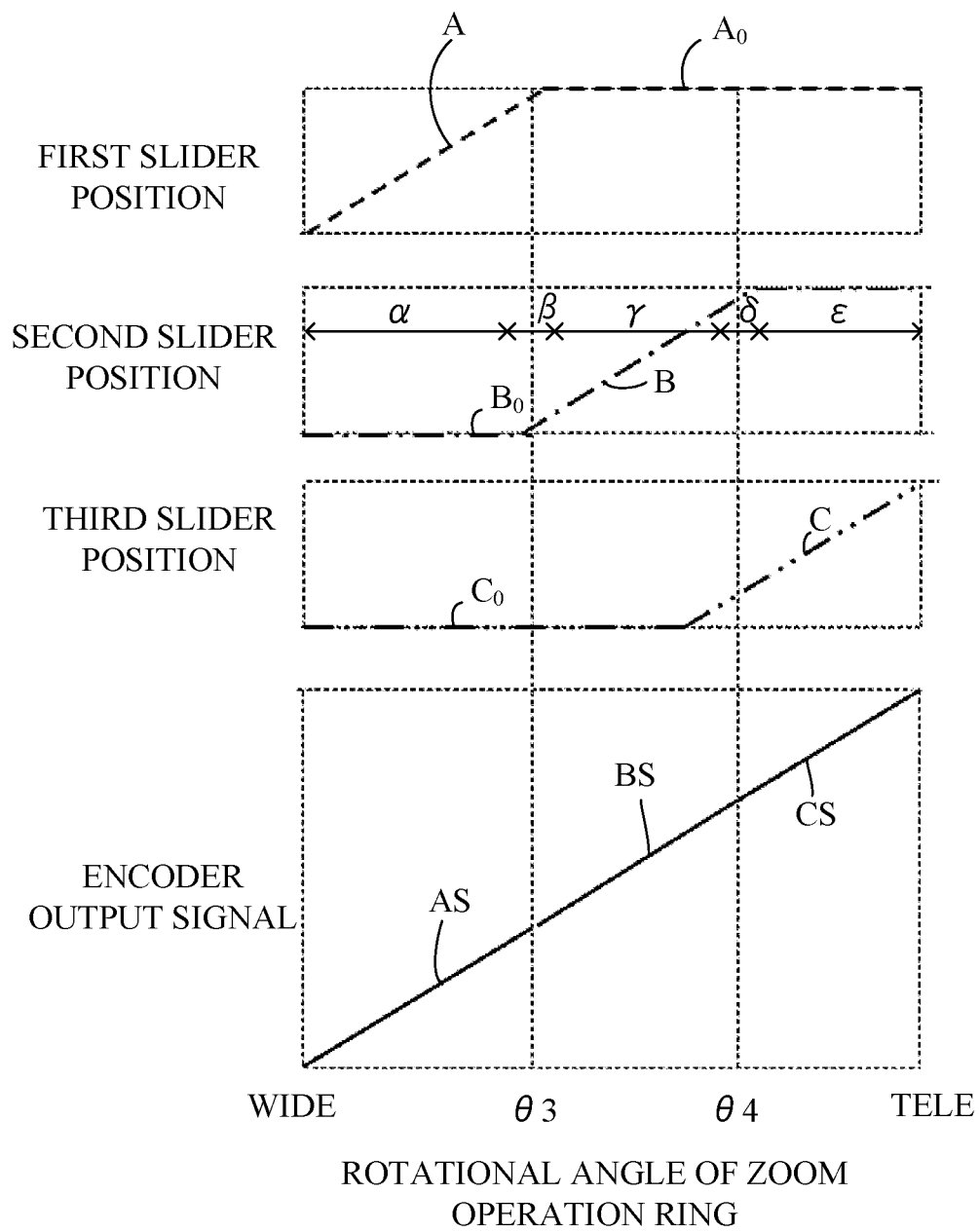
FIG. 10 illustrates a rotational angle of a zoom operation ring and a detection signal according to a third embodiment of the present invention.

The first and second embodiments have described use of two zoom encoders, but three or more zoom encoders may be used. FIG. 10 illustrates a relationship among the rotational angle of the zoom operation ring from WIDE to TELE and positions A, B, and C of sliders in three (first to third) zoom encoders according to a third embodiment of the present invention or the cam shapes of the three slider cam groove portions. FIG. 10 also illustrates changes in values of the first to third signals AS, BS, and CS output from the first to third zoom encoders. The abscissa axis in FIG. 10 indicates the rotational angle of the zoom operation ring 103, and the ordinate axis indicates the position of each slider and the signal value.

The zoom operation ring can rotate in a first rotational range $\alpha$, a second rotational range $\beta$ following the first rotational range $\alpha$, a third rotational range $\gamma$ following the second rotational range $\beta$, a fourth rotational range $\delta$ following the third rotational range $\gamma$, and a fifth rotational range $\varepsilon$ following the fourth rotational range $\delta$. The first slider cam groove portion that moves the first slider (whose position is indicated by A) of the first zoom encoder has a cam shape that moves the first slider when the zoom operation ring rotates in the first and second rotational ranges $\alpha$ and $\beta$, and a first zero-lift cam portion $A_0$ having a cam shape that does not move the first slider when the zoom operation ring rotates in the third to fifth rotational ranges $\gamma$ to $\varepsilon$. The second slider cam groove portion that moves the second slider (whose position is indicated by B) of the second zoom encoder has a second zero-lift cam portion $B_0$ that does not move the second slider when the zoom operation ring rotates in the first rotational range $\alpha$, and a cam shape that moves the second slider when the zoom operation ring rotates in the second to fourth rotational ranges $\beta$ to $\delta$. The third slider cam groove portion that moves the third slider (whose position is indicated by C) of the third zoom encoder has a third zero-lift cam portion Co that does not move the third slider when the zoom operation ring rotates in the first to third rotational ranges α to γ, and a cam shape that moves the third slider when the zoom operation ring rotates in the fourth and fifth rotational ranges δ and ε.

The zoom detector (rotational angle detection circuit) detects the rotational angle in the first rotational range α and on the WIDE side of the switching point (predetermined rotational position) θ3 in the second rotational range β of the zoom operation ring using the first signal AS. The rotational angle on the TELE side of the switching point θ3 in the second rotational range β and the rotational angle in the third rotational range γ and on the WIDE side of the switching point θ4 in the fourth rotational range δ are detected using the second signal BS. The rotational angle on the TELE side of the switching point θ4 in the fourth rotational range δ and the rotational angle in the fifth rotational range ε are detected using the third signal CS.

In this embodiment, the first zoom encoder and the second zoom encoder correspond to the first detector and the second detector, respectively, while the second zoom encoder and the third zoom encoder correspond to the first detector and the second detector, respectively. In this case, the third rotational range γ, the fourth rotational range δ, and the fifth rotational range E correspond to the first rotational range, the second rotational range, and the third rotational range, respectively.

This embodiment can detect the rotational angle of the zoom operation ring in a wide rotational range of the zoom operation ring, without increasing the area in the slider moving direction (optical axis direction) where the first to third slider cam groove portions are formed on the zoom operation ring.

Each of the above embodiments has discussed the interchangeable lens having the first and second cams on the zoom operation ring or the cam ring. However, the first and second cams may be provided on the zoom operation ring or the cam ring provided to the lens barrel in the lens-integrated camera (optical apparatus). The rotating member provided with the first and second cams is not limited to the rotating member in the optical apparatus, but may be a rotating member of various apparatuses.

The above embodiments can detect the rotational position of the rotating member with a simple structure and processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-114485, filed on Jun. 20, 2019, which is hereby incorporated by reference herein in its entirety.

What is claimed is:

1. A position detecting apparatus comprising:
a rotating member rotatable and having a first cam and a second cam;
a first detector having a first moving unit moved by the first cam as the rotating member rotates, the first detector being configured to output a first signal corresponding to a position of the first moving unit;
a second detector having a second moving unit moved by the second cam as the rotating member rotates, the second detector being configured to output a second signal corresponding to a position of the second moving unit; and
a rotational position acquirer configured to acquire a rotational position of the rotating member using the first signal and the second signal,
wherein the first cam moves the first moving unit in a first rotational range of the rotating member and a second rotational range following the first rotational range,
wherein the second cam moves the second moving unit in the second rotational range of the rotating member and a third rotational range following the second rotational range,
wherein the rotational position acquirer acquires the rotational position using the first signal in the first rotational range and in part on a first rotational range side in the second rotational range, and acquires the rotational position using the second signal in the third rotational range and in part on a third rotational range side in the second rotational range, and
wherein the second cam does not move the second moving unit in the first rotational range.

2. A position detecting apparatus comprising:
a rotating member rotatable and having a first cam and a second cam;
a first detector having a first moving unit moved by the first cam as the rotating member rotates, the first detector being configured to output a first signal corresponding to a position of the first moving unit;
a second detector having a second moving unit moved by the second cam as the rotating member rotates, the second detector being configured to output a second signal corresponding to a position of the second moving unit; and
a rotational position acquirer configured to acquire a rotational position of the rotating member using the first signal and the second signal,
wherein the first cam moves the first moving unit in a first rotational range of the rotating member and a second rotational range following the first rotational range,
wherein the second cam moves the second moving unit in the second rotational range of the rotating member and a third rotational range following the second rotational range,
wherein the rotational position acquirer acquires the rotational position using the first signal in the first rotational range and in part on a first rotational range side in the second rotational range, and acquires the rotational position using the second signal in the third rotational range and in part on a third rotational range side in the second rotational range, and
wherein the first cam does not move the first moving unit in the third rotational range.

3. A position detecting apparatus comprising:
a rotating member rotatable and having a first cam and a second cam;
a first detector having a first moving unit moved by the first cam as the rotating member rotates, the first detector being configured to output a first signal corresponding to a position of the first moving unit;
a second detector having a second moving unit moved by the second cam as the rotating member rotates, the second detector being configured to output a second signal corresponding to a position of the second moving unit; and a rotational position acquirer configured to acquire a rotational position of the rotating member using the first signal and the second signal, wherein the first cam moves the first moving unit in a first rotational range of the rotating member and a second rotational range following the first rotational range, wherein the second cam moves the second moving unit in the second rotational range of the rotating member and a third rotational range following the second rotational range, wherein the rotational position acquirer acquires the rotational position using the first signal in the first rotational range and in part on a first rotational range side in the second rotational range, and acquires the rotational position using the second signal in the third rotational range and in part on a third rotational range side in the second rotational range, and wherein the first cam moves the first moving unit in the third rotational range in a direction opposite to a moving direction of the first moving unit in the first and second rotational ranges.

4. A position detecting apparatus comprising:

a rotating member rotatable and having a first cam and a second cam;

a first detector having a first moving unit moved by the first cam as the rotating member rotates, the first detector being configured to output a first signal corresponding to a position of the first moving unit;

a second detector having a second moving unit moved by the second cam as the rotating member rotates, the second detector being configured to output a second signal corresponding to a position of the second moving unit; and a rotational position acquirer configured to acquire a rotational position of the rotating member using the first signal and the second signal, wherein the first cam moves the first moving unit in a first rotational range of the rotating member and a second rotational range following the first rotational range, wherein the second cam moves the second moving unit in the second rotational range of the rotating member and a third rotational range following the second rotational range, wherein the rotational position acquirer acquires the rotational position using the first signal in the first rotational range and in part on a first rotational range side in the second rotational range, and acquires the rotational position using the second signal in the third rotational range and in part on a third rotational range side in the second rotational range, wherein the first cam has a first zero-lift cam portion that does not move the first moving unit in the third rotational range, and the second cam has the second zero-lift cam portion that does not move the second moving unit in the first rotational range, and wherein a dividing line of a mold used to mold the rotating member is set so as to pass through the first zero-lift cam portion and the second zero-lift cam portion.

5. A position detecting apparatus comprising:

a rotating member rotatable and having a first cam and a second cam;

a first detector having a first moving unit moved by the first cam as the rotating member rotates, the first detector being configured to output a first signal corresponding to a position of the first moving unit;

a second detector having a second moving unit moved by the second cam as the rotating member rotates, the second detector being configured to output a second signal corresponding to a position of the second moving unit; and a rotational position acquirer configured to acquire a rotational position of the rotating member using the first signal and the second signal, wherein the first cam moves the first moving unit in a first rotational range of the rotating member and a second rotational range following the first rotational range, wherein the second cam moves the second moving unit in the second rotational range of the rotating member and a third rotational range following the second rotational range, wherein the rotational position acquirer acquires the rotational position using the first signal in the first rotational range and in part on a first rotational range side in the second rotational range, and acquires the rotational position using the second signal in the third rotational range and in part on a third rotational range side in the second rotational range, and wherein the first detector includes a first output unit configured to output the first signal, and the second detector includes a second output unit configured to output the second signal, and the first output unit and the second output unit are arranged on opposite sides in moving directions of the first and second moving units.

6. A position detecting apparatus comprising:

a rotating member rotatable and having a first cam and a second cam;

a first detector having a first moving unit moved by the first cam as the rotating member rotates, the first detector being configured to output a first signal corresponding to a position of the first moving unit;

a second detector having a second moving unit moved by the second cam as the rotating member rotates, the second detector being configured to output a second signal corresponding to a position of the second moving unit; and a rotational position acquirer configured to acquire a rotational position of the rotating member using the first signal and the second signal, wherein the first cam moves the first moving unit in a first rotational range of the rotating member and a second rotational range following the first rotational range, wherein the second cam moves the second moving unit in the second rotational range of the rotating member and a third rotational range following the second rotational range, wherein the rotational position acquirer acquires the rotational position using the first signal in the first rotational range and in part on a first rotational range side in the second rotational range, and acquires the rotational position using the second signal in the third rotational range and in part on a third rotational range side in the second rotational range, and wherein the rotational position acquirer acquires the rotational position of the rotating member in the second rotational range using either the first signal or the second signal without using both the first signal and the second signal.

7. The position detecting apparatus according to claim 6, wherein the rotational position acquirer acquires the rotational position of the rotating member in the first rotational range using either the first signal or the second signal without using both the first signal and the second signal, and wherein the rotational position acquirer acquires the rotational position of the rotating member in the third rotational range using either the first signal or the second signal without using both the first signal and the second signal.

\* \* \* \* \*